(12) United States Patent
Callot et al.

(10) Patent No.: US 12,033,048 B1
(45) Date of Patent: Jul. 9, 2024

(54) ANOMALY DETECTION USING FEEDBACK

(71) Applicant: Amazon Technologies, Inc., Seattle, WA (US)

(72) Inventors: Laurent Callot, Berlin (DE); Jasmeet Chhabra, Sammamish, WA (US); Lifan Chen, Mercer Island, WA (US); Ming Chen, Seattle, WA (US); Tim Januschowski, Berlin (DE); Andrey Kan, Seattle, WA (US); Luyang Kong, Seattle, WA (US); Baris Kurt, Berlin (DE); Pramuditha Perera, Secausus, NJ (US); Mostafa Rahmani, Santa Clara, CA (US); Parminder Bhatia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 809 days.

(21) Appl. No.: 17/107,820

(22) Filed: Nov. 30, 2020

(51) Int. Cl.
*H04L 29/06* (2006.01)
*G06F 18/214* (2023.01)
*G06N 20/20* (2019.01)

(52) U.S. Cl.
CPC ........... *G06N 20/20* (2019.01); *G06F 18/214* (2023.01)

(58) Field of Classification Search
CPC ... G06N 20/20; G06F 18/214; H04L 63/1425; H04L 63/1433; H04L 63/1416; H04L 63/20

See application file for complete search history.

(56) References Cited

U.S. PATENT DOCUMENTS

| 9,378,361 | B1* | 6/2016 | Yen | H04L 63/14 |
|---|---|---|---|---|
| 9,516,053 | B1* | 12/2016 | Muddu | G06F 3/0484 |
| 11,824,646 | B1* | 11/2023 | Muddu | H04L 41/22 |
| 2008/0072321 | A1* | 3/2008 | Wahl | H04L 63/14 |
| | | | | 726/22 |
| 2008/0262985 | A1* | 10/2008 | Cretu | G06N 20/00 |
| | | | | 706/59 |
| 2018/0316705 | A1* | 11/2018 | Tsironis | H04L 41/145 |
| 2018/0316706 | A1* | 11/2018 | Tsironis | H04L 63/1408 |

(Continued)

OTHER PUBLICATIONS

Siddiqui, M.A., et al., "Feedback-Guided Anomaly Discovery via Online Optimization," Proceedings of the 24th ACM SIGKDD International Conference on Knowledge Discovery & Data Mining, KDD 2018, Aug. 2018, pp. 2200-2209.

(Continued)

*Primary Examiner* — Khalid M Almaghayreh
(74) *Attorney, Agent, or Firm* — Nicholson De Vos Webster & Elliott LLP

(57) ABSTRACT

Techniques for performing anomaly detection are described. An exemplary method includes receiving a request to detect potential anomalies using an anomaly detection system having at least one anomaly scoring model; processing the received data using the anomaly detection system to score the data to determine when the data is potentially anomalous based on one or more thresholds; requesting feedback of at least one determined potential anomaly; receiving feedback on the least one determined potential anomaly; and adjusting at least one of one or more thresholds used to determine potential anomalies and what is considered an anomaly without adjusting the at least one anomaly scoring model.

20 Claims, 9 Drawing Sheets

(56) References Cited

U.S. PATENT DOCUMENTS

| | | | | |
|---|---|---|---|---|
| 2018/0316713 | A1* | 11/2018 | Tsironis | H04L 63/1425 |
| 2018/0316727 | A1* | 11/2018 | Tsironis | H04L 63/0263 |
| 2019/0114419 | A1* | 4/2019 | Chistyakov | G06F 17/15 |
| 2020/0004961 | A1* | 1/2020 | Prokudin | G06F 21/567 |
| 2020/0167464 | A1* | 5/2020 | Griffin | G06F 21/563 |
| 2020/0296124 | A1* | 9/2020 | Pratt | H04L 63/20 |
| 2022/0011950 | A1* | 1/2022 | Martin | G06F 21/78 |
| 2022/0053010 | A1* | 2/2022 | Elyashiv | G06N 3/088 |
| 2022/0201014 | A1* | 6/2022 | Saha | G06N 20/00 |

OTHER PUBLICATIONS

Liu, F.T., et al., "Isolation Forest" in 2008 Eighth IEEE International Conference on Data Mining, 2008, 10 pages.

Das, S., et al., "Incorporating Feedback into Tree-based Anomaly Detection," Aug. 2017, 9 pages. located at: http;//arxiv.org/abs/1708.09441.

Das, S. et al., "Incorporating Expert Feedback into Active Anomaly Discovery," 2016 IEEE 16th International Conference on Data Mining (ICDM), Dec. 2016, 6 pages.

Pevny, Tomas "Loda: Lightweight on-line detector of anomalies," Machine Learning, 102(2):275304, Feb. 2016, 30 pages. located at: https://doi.org/10.1007/s10994-015-5521-0.

Siddiqui, M.A., et al., "Detecting Cyber Attacks Using Anomaly Detection With Explanations and Expert Feedback," ICASSP 2019—2019 IEEE International Conference on Acoustics, Speech and Signal Processing (ICASSP), pp. 2872-2876 (5 pages), 2019.

Vercruyssen, Vincent, et al., "Semi-supervised Anomaly Detection with an Application to Water Analytics," 2018 IEEE International Conference on Data Mining (ICDM), pp. 527-536 (10 pages), 2018.

Varadarajan, J., et al., "Active Online Anomaly Detecting using Dirichlet Process Mixture Model and Gaussian Process Classification," 2017 IEEE Winter Conference on Applications of Computer Vision (WACV), pp. 615-623 (9 pages), 2017.

Raginsky, M., et al., "Sequential Anomaly Detection in the Presence of Noise and Limited Feedback," CoRR, abs/0911.2904, 2009. (19 pages), Mar. 2012. located at: http://arxiv.org/abs/0911.2904.

Horn, Corinne, et al., "Online Anomaly Detection with Expert System Feedback in Social Networks," 2011 IEEE International Conference on Acoustics, Speech and Signal Processing (ICASSP), pp. 1936-1939 (4 pages), 2011.

\* cited by examiner

ANOMALY DETECTION USING FEEDBACK

BACKGROUND

Sequential anomaly detection is widely used in various fields, including cyber-security, scientific discovery, operational metrics monitoring, etc. The goal is to detect unlikely and rare events that are both statistically abnormal and are relevant to a user's specific application.

Most anomaly detectors provide a ranked list of statistical anomalies. End-users are typically not interested in all statistical anomalies but only in those that are relevant to their specific application. As a result, extra manual efforts are needed to locate the subset of interest.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for anomaly detection and changes to that detection using feedback. In some embodiments feedback is used to adjust a sensitivity of an anomaly detection system, that is, to modify the threshold used to classify observations as anomalous. In some embodiments, feedback is used to learn to distinguish between anomalies that are relevant and anomalies that are not as irrelevant to a requester.

In some embodiments, when an anomaly detection system is created, its sensitivity is set at some default value that is a function of the properties of the data, but not of labels or preferences. The default sensitivity can be orders of magnitude away from a preferred sensitivity, about which there may be no prior information.

The anomaly detection algorithms/models detailed herein are trained to flag statistical anomalies, that is, values that are unexpected based on use of one or more trained models. Detecting statistical anomalies is an unsupervised task that only requires historical data in some embodiments. Typically, users are not interested in being alerted on statistical anomalies, but on anomalies that are of concern for a particular use case and particular anomalies are a subset of statistical anomalies, and embodiments herein describe systems, processes, etc. to learn what statistical anomalies are relevant.

Figure 1:
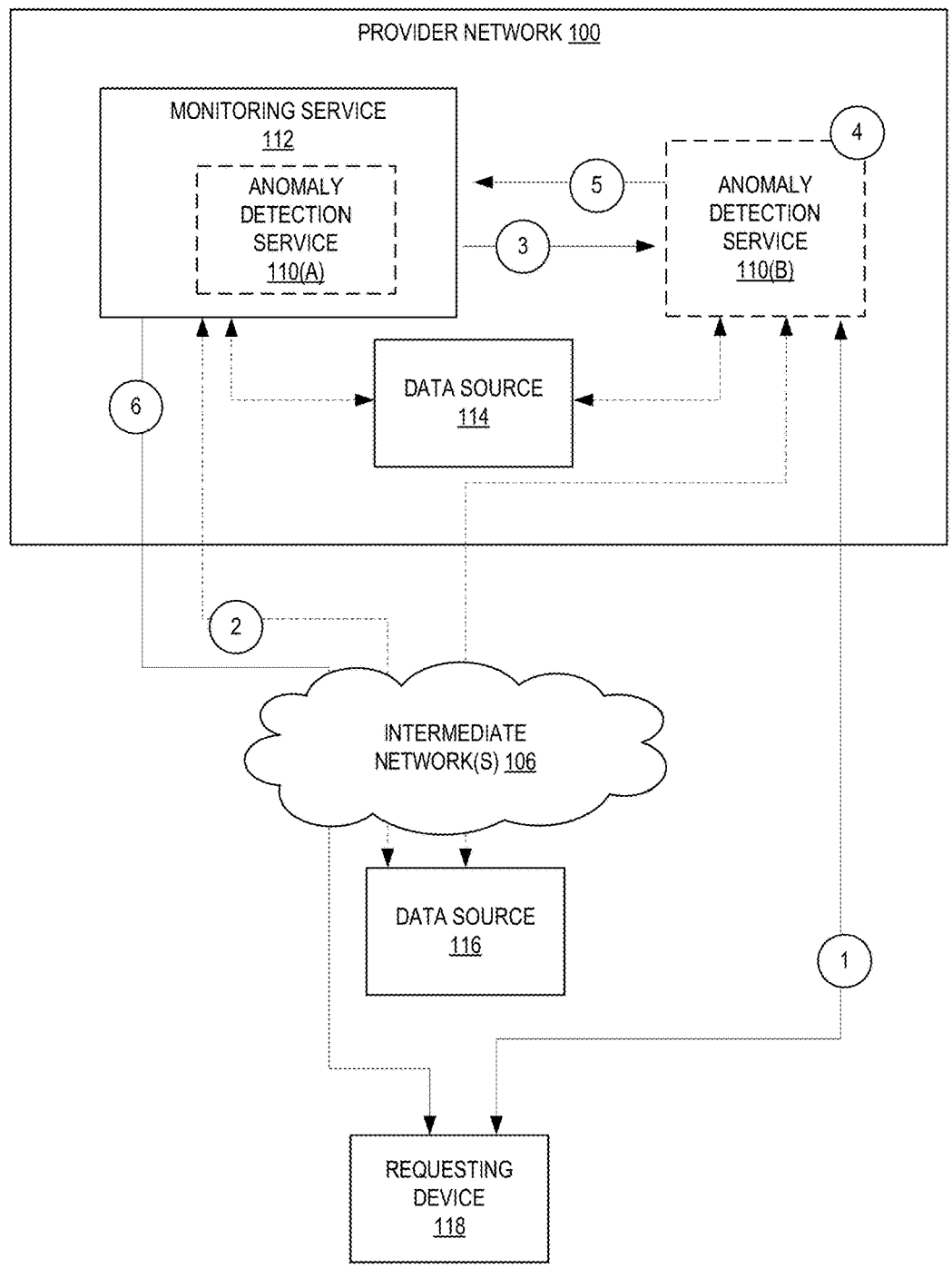
FIG. 1 illustrates embodiments of a provider network that includes an anomaly detection service.

FIG. 1 illustrates embodiments of a provider network 100 that includes an anomaly detection service. The anomaly detection service 110(A) or 110(B) operates on, for example, log or time series data. Note that in some embodiments, as shown, the anomaly detection service is a part of a monitoring service 112 (anomaly detection service 110(A)) and in some embodiments, the anomaly detection service is external to the monitoring service 112 (anomaly detection service 110(B)). The monitoring service 112 may perform one or more of the following non-anomaly detection functions: collecting and storing logs, collecting metrics (including time series data) that may be default or custom, aggregating metrics, generating alarms, auto-scale resources, etc.

The data sources 114 and 116 provide data (e.g., logs or time series data) to be evaluated by the anomaly detection service 110(A) or 110(B) for potential anomalies. The anomaly detection service 110(A) or 110(B) includes, or has access to, a plurality of different machine learning models (e.g., as an ensemble or individually) or other anomaly detection mechanisms (e.g., statistical). These models/algorithms analyze metrics of systems and applications, determine normal baselines, and surface anomalies with minimal user intervention. Each anomaly scorer associates to each new data point a score based on the statistical rarity of the observation (e.g., with respect to a training set or existing data).

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Circles with numbers inside indicate an exemplary flow of activities. At circle 1, a requesting device 118 sends a request to the provider network 10 configure the anomaly detection service 110(B). Exemplary content of such a request is detailed later.

At circle 2, after the configuration of the anomaly detection service 110(B), the data source 116 provides data to be evaluated. The anomaly detection service 110(B) evaluates the data at circle 3 and determines there is an anomaly. The anomaly detection service 110(B) sends an indication of the anomaly to the requesting device 118 asking for feedback at circle 4.

The requesting device provides the feedback at circle 5 and the anomaly detection service 110(B) updates one or more of its sensitivity or anomaly relevancy at circle 6.

Figure 2:
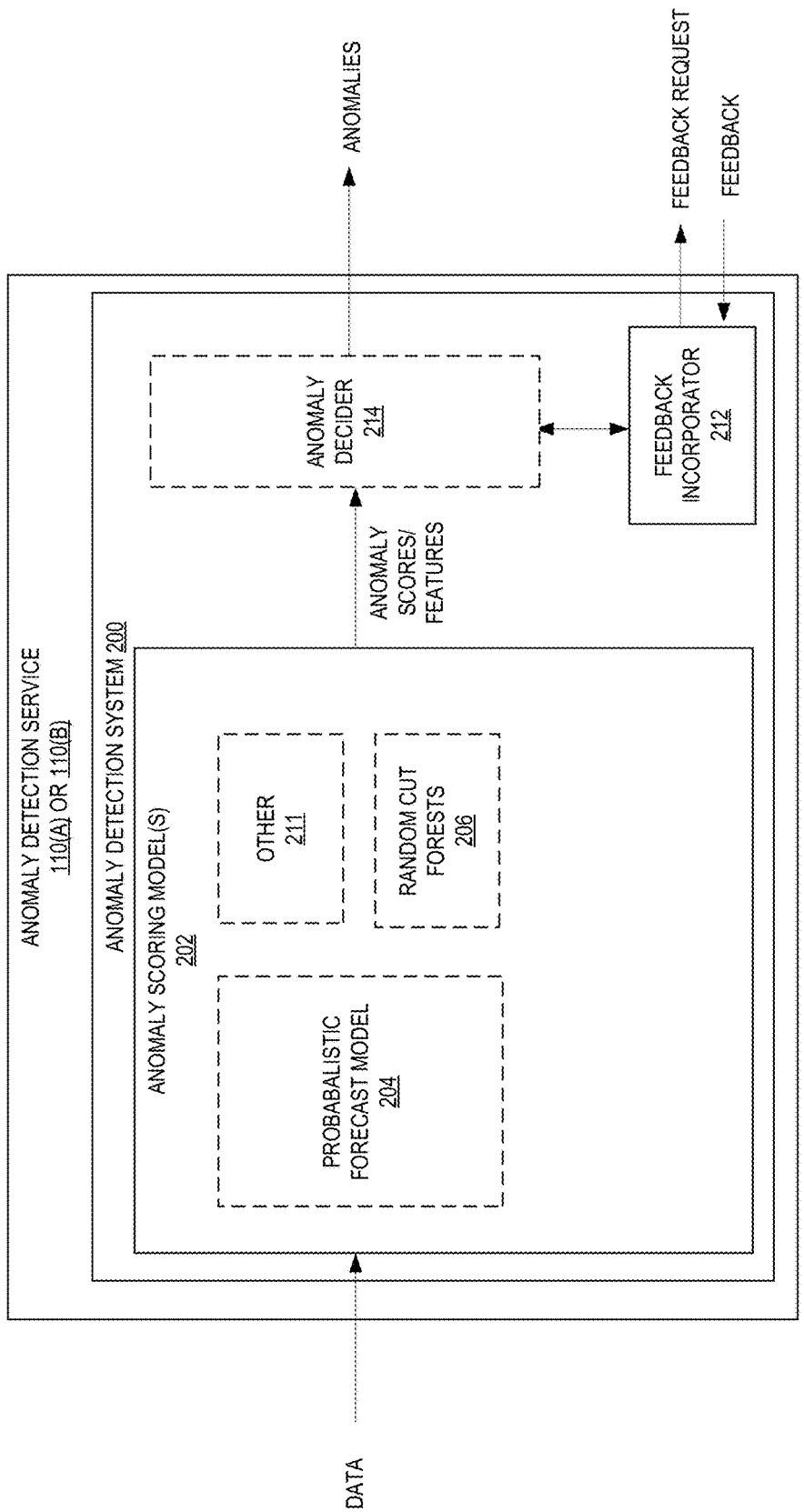
FIG. 2 illustrates embodiments of an anomaly detection service. In some embodiments, this illustrates the anomaly detection service of FIG. 1.

FIG. 2 illustrates embodiments of an anomaly detection service. In some embodiments, this illustrates the anomaly detection service 110(A) or the anomaly detection service 110(B) of FIG. 1. As shown, the anomaly detection service 110(A) or 110(B) includes an anomaly detection system 200 that includes one or more anomaly scoring model(s) 202. In this example, the anomaly scoring model(s) 202 includes one or more of is a probabilistic forecast model 204, a random cut forests model 206, an "other" model 211. One or more of these models 202 take in data and generate anomaly scores and/or features based on the input data in the input data.

The Random Cut Forest (RCF) model 206 represents a class of ensemble methods (similar to isolation forest) which estimates the density of data points directly by a forest of random cut trees. Each tree randomly cuts high dimensional data points into sub-spaces. The number of cuts is required to isolate a point is proportional to its estimated density. The depth of a data point in a tree is a measure of the rarity of this point, which yields an anomaly score.

An anomaly decider 214 takes scores and/or features from one or more of the anomaly scoring models 202 and determines if there is an anomaly to raise or not. In some embodiments, an anomaly is raised when a score for a datapoint is less than a threshold. In some embodiments, an anomaly is raised when a score for a datapoint is greater than a threshold. Note that the score may be some combination of multiple models such as an average, a mean, etc.

The anomaly detection service 110(A) or the anomaly detection service 110(B) also includes a feedback incorporator 212 that receives feedback on a detected potential anomaly and uses that feedback to adjust the output of the service. Note that the models 202 themselves are not adjusted. In particular, the feedback incorporator 212 tweaks the anomaly decider 214 to modify the threshold used to classify observations to output as anomalous and/or what is considered to be anomalous.

Figure 3:
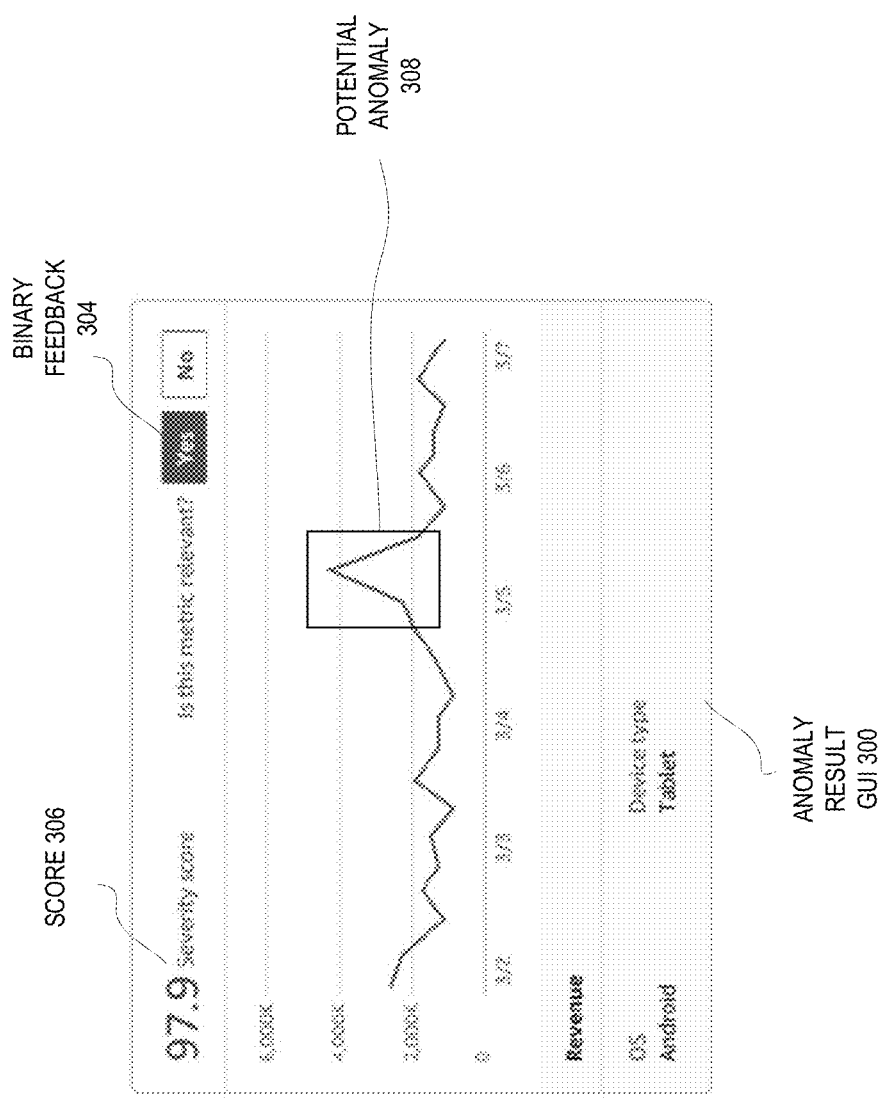
FIG. 3 illustrates an example of a graphical user interface that allows for binary feedback.

Typically, the feedback is received by way of a graphical user interface (GUI). However, feedback may be provided based on raw data, etc. FIG. 3 illustrates an example of a GUI 300 that allows for binary feedback (e.g., positive—it was anomalous or negative—it was not anomalous). In this illustration, a revenue trend is tracked over time. On March 5 there is a sudden spike in that revenue. This spike is given, by one or more anomaly detection models, a severity score 306 indicating its likelihood of being anomalous (in this case, the more severe the score, the more likely it is to be anomalous). In this example, the spike is highlighted by potential anomaly box 308. A means for providing feedback for this is provided by binary feedback input 304. In particular, is this metric relevant (positively treated) or not?

Figure 4:
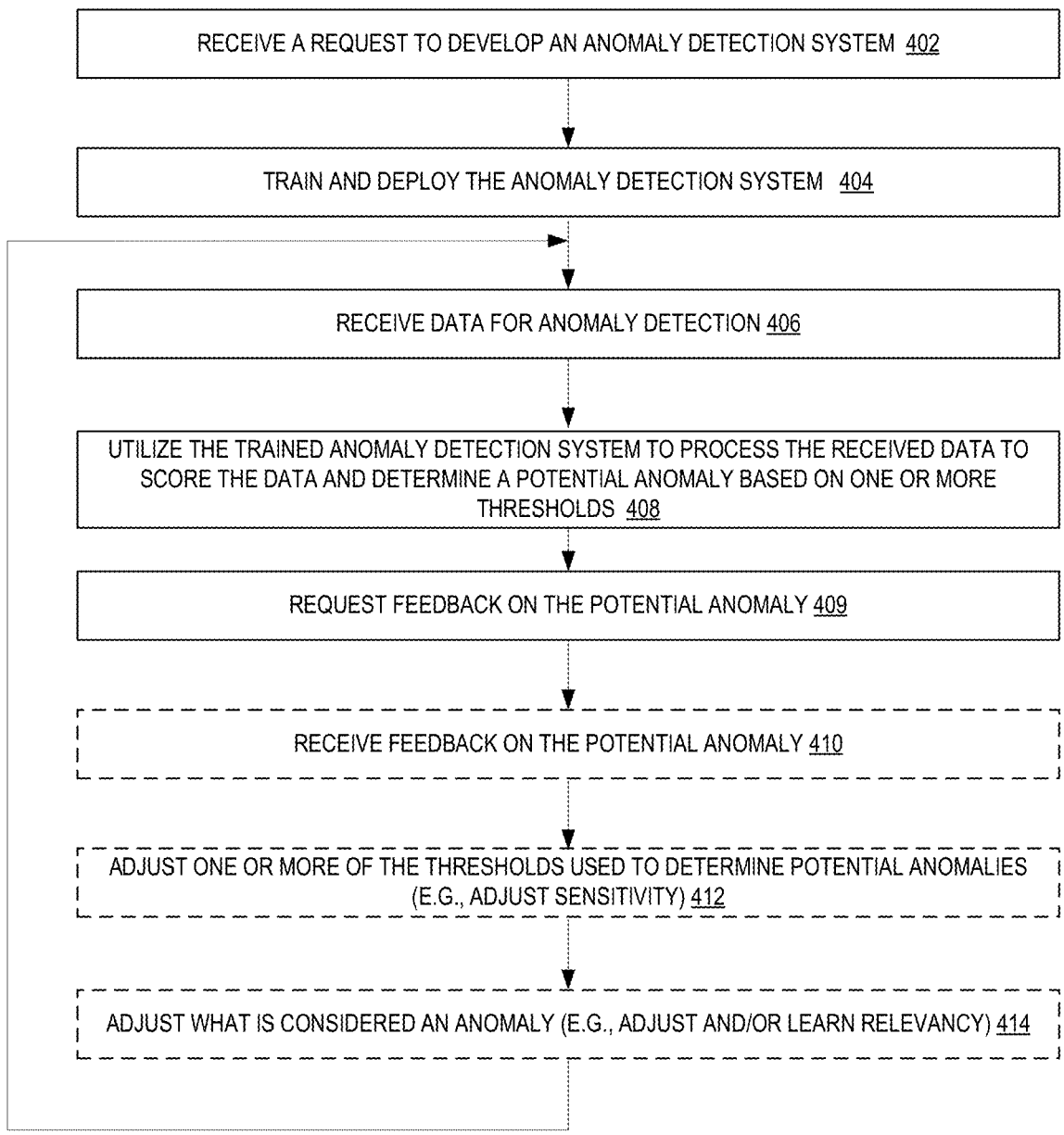
FIG. 4 is a flow diagram illustrating operations of a method for anomaly detection that incorporates according to some embodiments.

FIG. 4 is a flow diagram illustrating operations of a method for anomaly detection that incorporates according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service 110(A) or 110(B) of the other figures.

A request to develop an anomaly detection system is received at 402. In particular, in some embodiments, the request is one to train and deploy an anomaly detection system of an anomaly detection service. The request includes one or more of: an indication of a location of a dataset to be used for training: a dataset to be used for training: an indication of at least one machine learning algorithm to train to become an anomaly detection model: at least one machine learning algorithm to train to become an anomaly detection model: and/or an indication of a location of a location to store results of anomaly detection.

At 404, the anomaly detection system is trained and deployed using the training data of or indicated by the request. In some embodiments, the training data is historical observations of the metrics to monitor (e.g., time series data having a value and a time). As such, in some embodiments, the training data is unlabeled. In other embodiments, the training data includes at least some labeled training data.

Once the one or more models are deployed, data is received for anomaly detection at 406.

The trained anomaly detection system is used to process the received data to score the data and determine if there is a potential anomaly based on one or more thresholds at 408. For example, one or more of the models 202 are used to generate a score and the anomaly decider 214 determines if that score indicates that there is an anomaly based one or more thresholds.

When a potential anomaly has been determined, a request for feedback on the potential anomaly is made at 409. An example of a request is a GUI showing the anomaly with a means of providing negative or positive feedback.

In some embodiments, feedback on the potential anomaly is received at 410. This feedback may be used to adjust sensitivity and/or what is considered an anomaly.

At 412, in some embodiments, one or more of the thresholds used to determine potential anomalies are adjusted (e.g., adjust sensitivity).

At 414, in some embodiments, what is considered an anomaly is adjusted (e.g., adjust and/or learn relevancy).

The sending every single potential anomaly based on preset a threshold may result in unwanted anomaly indications being sent. As such, in some embodiments, the anomaly detection service 110(A) or the anomaly detection service 110(B) learns a preferred sensitivity the generation of a potential anomaly based on feedback (either explicit or implicit). Specifically, in some embodiments, a desired point on the precision-recall curve of the model is determined. Note that no response may be treated as an implicit indication that there are too many anomalies and therefore to be treated as a negative.

The received feedback may be biased in that 1) feedback may not be required or only sporadically provided: 2) negative feedback could mean that the reported anomaly is not considered to be a statistical anomaly or it is a statistical anomaly, but not one that is relevant: 3) there may be no feedback on false negatives (and when diminishing the sensitivity it may increase the rate of false negative without mechanism to report this): 4) different preferences might provide feedback on the same detector. In some embodiments, the threshold value update effectively considers all the received feedback and recently received feedback is weighted more than old feedback. It is important to note again that there is no update to a model, only to the threshold for reporting an anomaly.

Figure 5:
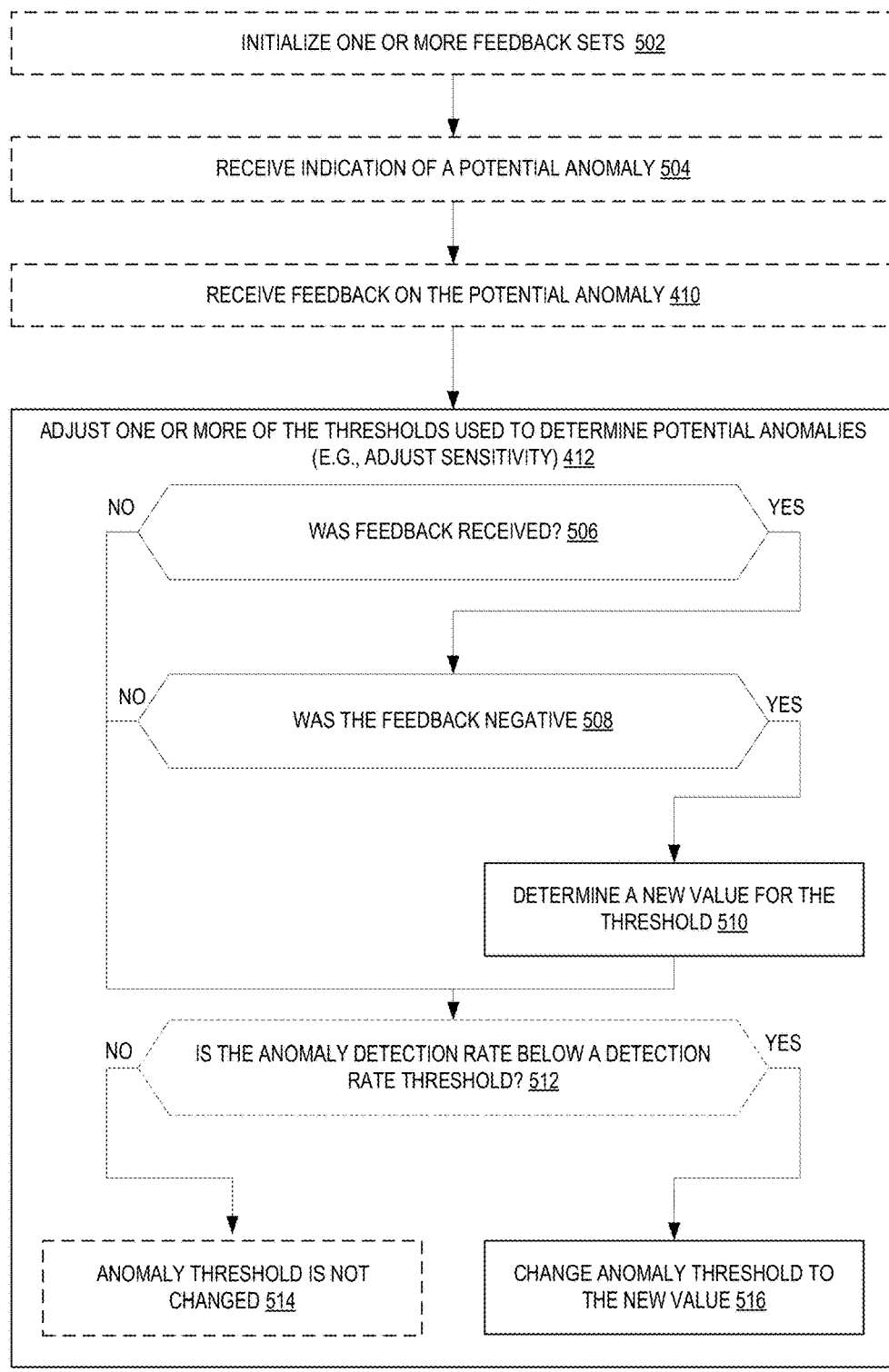
FIG. 5 is a flow diagram illustrating operations of a method for adjusting sensitivity according to some embodiments.

FIG. 5 is a flow diagram illustrating operations of a method for adjusting sensitivity according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by at least the feedback adjuster 212 of the other figures.

At 502 one or more feedback sets are initialized (if needed). In some embodiments, there is at least one set of negative feedbacks and at least one set of positive feedbacks. In other embodiments, there is one set having both. A feedback set includes the score associated with the feedback and the time of the datapoint that was detected as potentially anomalous.

At some point later in time, while the anomaly detection model(s) are evaluating new datapoints, a new anomalous score indicating an anomaly is generated. That is the anomaly decider 214 receives a score from the anomaly detection model(s) 202 and decides that there is an anomaly based on an existing threshold. The feedback adjuster 212 is provided an indication of this potential anomaly at and requests feedback at 504.

In some embodiments, feedback is received at 410 and at 412, in some embodiments, one or more of the thresholds used to determine potential anomalies are adjusted (e.g., adjust sensitivity). This potential threshold adjustment may include several acts.

A determination of if feedback is received regarding that potential anomaly is made at 506. When there is feedback, a determination of if the feedback was negative is made at 508. When the feedback is negative, the feedback set for negative feedback is updated with the score and time stamp of the datapoint. When the feedback is positive, the feedback set for positive feedback is updated with the score and time stamp of the datapoint.

For negative feedback, a determination of a new value for the anomaly threshold is made at 510. An example of an equation to be solved is shown below:

$$\min_{b,\gamma_i|_{i=1}^{M_1}, \lambda_i|_{i=1}^{M_2}} \frac{1}{\sum_{i=1}^{M_1} f(t_p - t_{p_i})} \sum_{i=1}^{M_1} \gamma_i f(t_p - t_{p_i}) +$$

$$\frac{1}{\sum_{i=1}^{M_2} f(t_n - t_{n_i})} \sum_{i=1}^{M_2} \lambda_i f(t_n - t_{n_i}) + \min_{i \in I_b}(x_i - b - \tau)$$

subject to $x_i - b > \tau - \gamma_i$ for all $1 \le i \le M_1$
$b - y_i > \tau - \lambda_i$ for all $1 \le i \le M_2$
$\gamma_i \ge 0$ and $\lambda_i \ge 0$
$I_b = \{i | x_i - \tau > b\}$ to find the next threshold value $b$, where $t_p = \max\{t_{p_i}\}$, $t_n = \max\{t_{n_i}\}$, and $f(t_1 - t_2) = \exp\left(-\frac{t_1 - t_2}{d}\right)$.

In this equation, there are a few hyperparameters which can be set in a request of $\sigma$, $\tau$, $\in$, and d. The parameter d controls the decay function and the higher d is, the slower older feedback is forgotten. The parameter $\tau$ is a minimum distance for a threshold to have from positive and negative scores. The parameter $\sigma$ is a detection rate threshold. The parameter $\in$ is a delta to apply to classification threshold. A cost function is made from two separate decay functions applied to set of relaxation parameters and the final term (the min term) encourages the threshold value to be close to the negative scores which are higher than the threshold b.

When there was no feedback, the feedback was positive, or after a new value for the anomaly threshold has been calculated, a determination of if the anomaly detection irate is below a detection rate threshold is made at 512 in some embodiments.

When the detection rate is not below a detection rate threshold, the anomaly threshold is not changed at 514 in some embodiments. When the detection rate is below a detection rate threshold (if used), the anomaly threshold is changed to the new value at 516. When a detection rate threshold is not used, the anomaly threshold is changed to the new value at 516.

Figure 6:
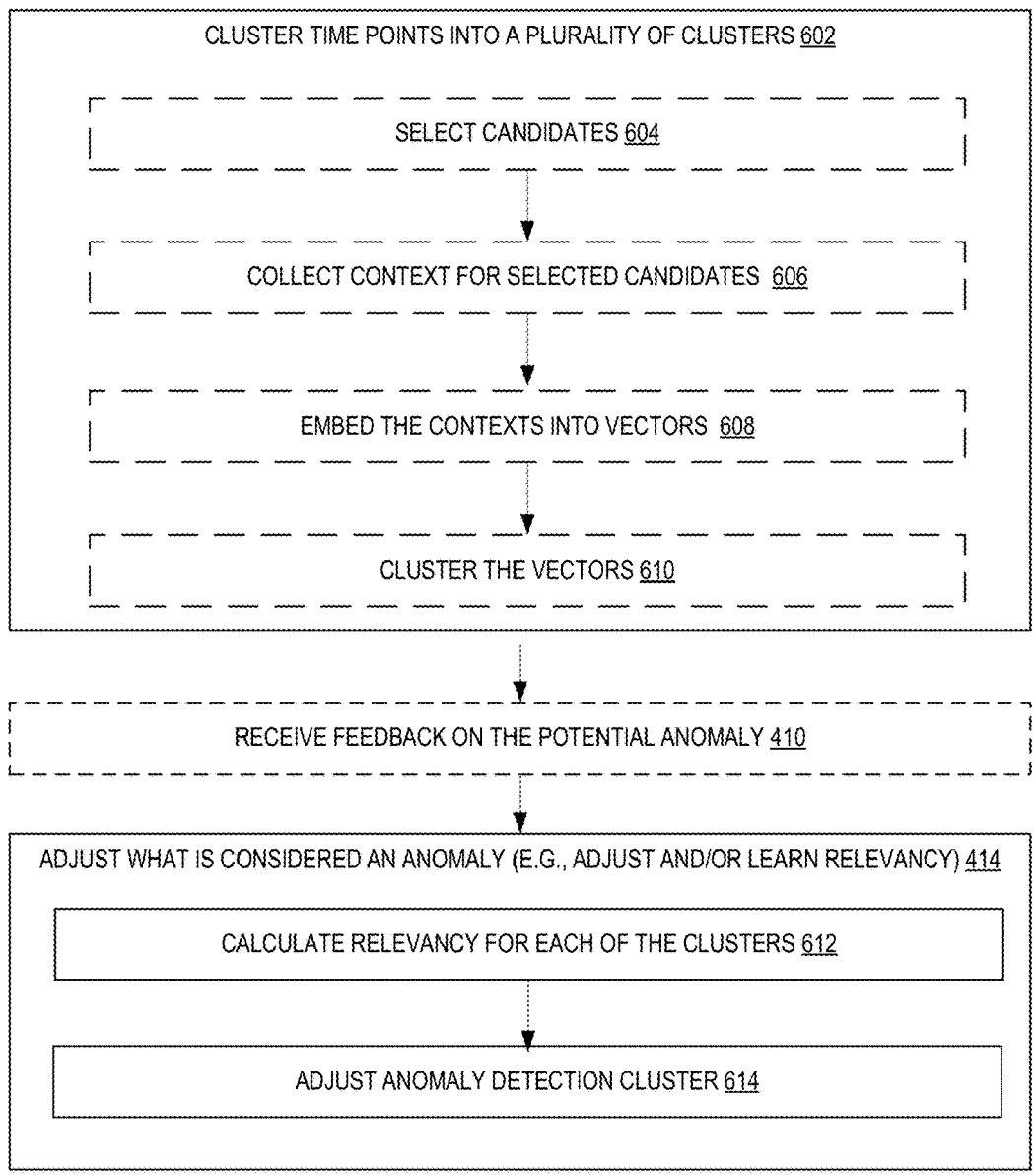
FIG. 6 is a flow diagram illustrating operations of a method for adjusting what is considered an anomaly according to some embodiments.

As noted, in some embodiments, what is considered an anomaly is adjusted (e.g., adjust and/or learn relevancy). FIG. 6 is a flow diagram illustrating operations of a method for adjusting what is considered an anomaly according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by feedback adjuster 212 of the other figures.

At 602 time points are clustered into a plurality of clusters. In some embodiments, assuming a time-series data set $V^t = (v_1, v_2, \ldots v_n)$, a black-box base anomaly detection system generates scores $P^t = (p_1, P_2, \ldots p_n)$, where $p_i \in [0,1)$, with its detection threshold $\tau_a \in [0,1)$ such that observations with $p_i > \tau_a$ are classified as anomalies. In particular, time points are clustered with a high $p_i$ (anomaly score). In some embodiments, this includes one or more sub acts.

At 604 candidates are selected. In some embodiments, the clustering candidate population by giving certain threshold $\tau^c \in [0,1]$:

$S^c := \{p_i | \forall i \in [1,2, \ldots ,t]: p_i > \tau^c\}$.

If $\tau^c = 0$, all the points are included in the clustering process.

At 606, a context for selected candidates is collected. For example, consider the original time point $v_t$ at time t, a context vector with length m at time t is defined as $h_t := (v_{t-m}, \ldots ,v_t)$.

The context set $S^c$ of anomaly candidate set $S^c$ $S^c := \{h_t | \forall z_t \in S^c\}$.

is collected.

The collected context is embedded into vectors at 608. In some embodiments, a low-dimensional embedding of subsequence contexts in $S^C$ is created such that a contextual feature map of each time point may be obtained:

$S^E := \{\vec{e}_t = f_E(h_t) | h_t \in S^C\}$.

In this instance, $f_E$ is a sequence embedding function. In some embodiments, a sequence auto-encoder with bi-directional LSTM as the encoder and decoder is used.

The vectors are clustered at 610. With the feature map $S^E$ generated above, we can apply clustering algorithms on top of it:

$S^C := \{c_i = g(\vec{e}_i), c_i \in [1, \ldots ,k] | \vec{e}_i \in S^E\}$ g is the clustering function and k is the number of clusters.

A relevancy for each of the clusters is calculated at 612. These relevance scores are assigned on the concentration of feedback and representing the degree to which each cluster is relevant to users' preferences. Consider the distribution $\vec{d}_c$ over clusters on anomaly candidate set $S^c$, the positive distribution $\vec{d}^+$ over clusters on intersection of $S^c$ and positive labels and the negative distribution $\vec{d}^-$ on intersection of $S^c$ and negative labels. Cluster relevancy vector is a function of the three distribution vectors above. It is formulated as:

$$\vec{r} = \frac{\exp((\vec{d}^+ - \vec{d}^c)/\vec{d}^c)}{\exp((\vec{d}^- - \vec{d}^c)/\vec{d}^c)} = \exp\left(\frac{\vec{d}^+ - \vec{d}^-}{\vec{d}_c}\right)$$

Intuitively, the numerator represents positive feedback's distribution deviation from the overall population, while the denominator is that of negative feedback. The exponential transformation is used for smoothing purposes, since $\vec{r}$ will be used for scaling in the following steps.

At 614 the anomaly detection cluster is adjusted. For example, the anomaly decider 214 is adjusted. The relevancy score $\vec{r}$ is used to adjust the anomaly selection process in next incoming batch. For example, suppose next batch's data comes in as $$V^{t:T} = (v_t, v_{t+1}, \ldots, v_T),$$

with base detector scores $$p^{t:T} = (p_t, p_{t+1}, \ldots, p_T).$$

The inference step on the new data batch would include the actions 604-10 (e.g., candidate selection $S_{t:T}^C$; context collection $S_{t:T}^C$; applying a learned embedding function $f_E^l$ to get embedding $S_{t:T}^E$; and applying a learned clustering function g to get cluster assignment $S_{t:T}^{\mathcal{C}}$.

The base anomaly detection system will classify all the observations $S_{t:T}^b$; whose scores are larger than arbitrary threshold $\tau^a$ as anomalies:

$$S_{t:T}^b := \{v_i | \forall p_i > \tau^a, i = t, t+1, \ldots, T\}.$$

Anomaly occurrences are counted across clusters $S_{t:T}^C$:

$$\vec{N}^b = [n_1, n_2, \ldots, n_k]^T.$$

The adjusted cluster-wise anomaly size is then formulated as:

$$\vec{N}^{adj} = \vec{N}^b \odot \vec{r},$$

where $\odot$ is point-wise multiplication and $\vec{N}^{adj}$. With each element in $\vec{N}^{adj}$ rounded down to integer, it represents an estimated number of relevant anomalies in each cluster. The corresponding number of anomalies is selected per cluster according to $\vec{N}^{adj}$ Inside each individual cluster, a ranking is produced by the base anomaly detection system scores. This is repeated for every new coming batch.

Figure 7:
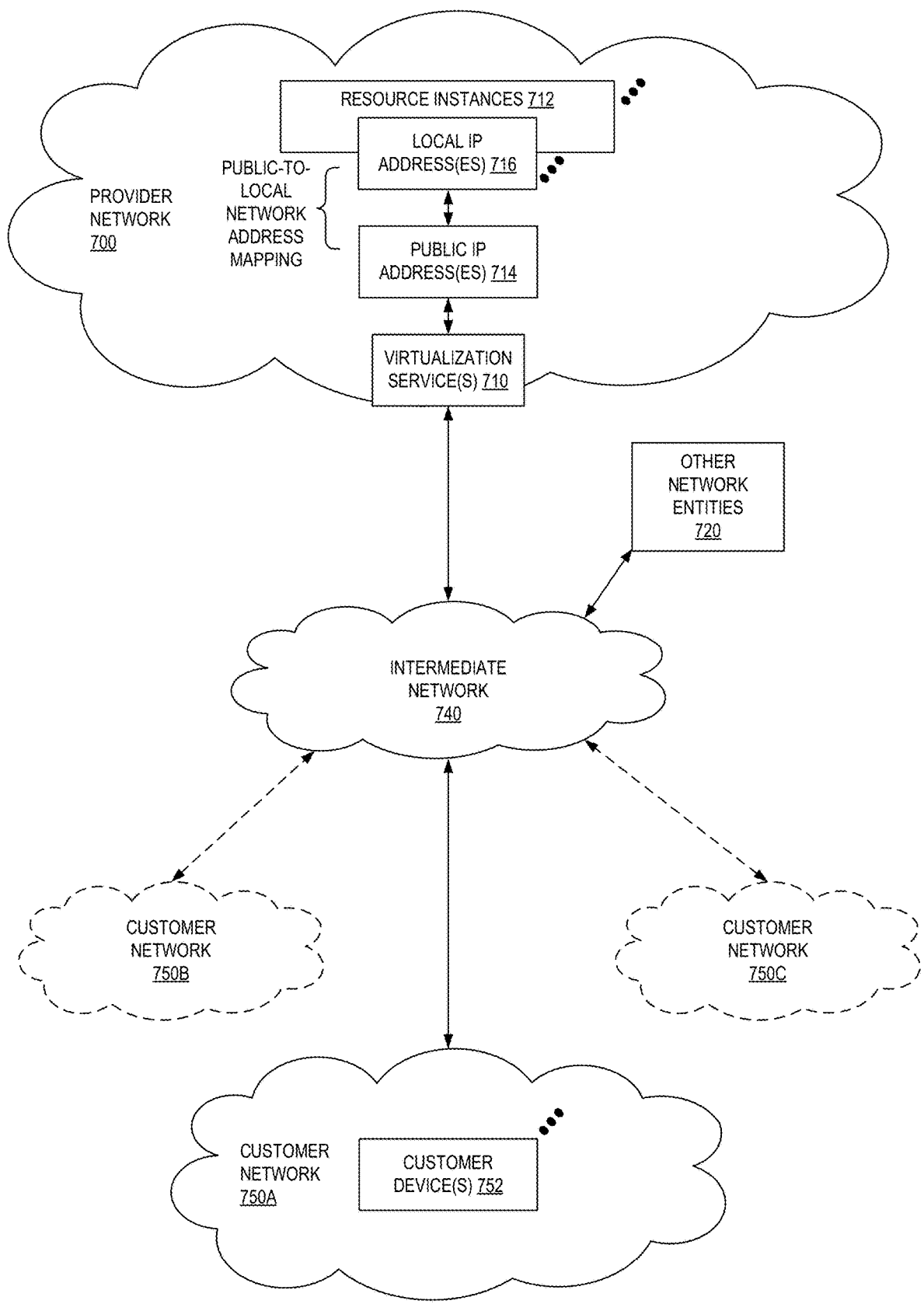
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712: the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or 7 more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740), such as the Internet. Other network entities 720 on the intermediate network 740 may then generate traffic to a destination public IP address 714 published by the customer network(s) 750A-750C: the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses.

Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
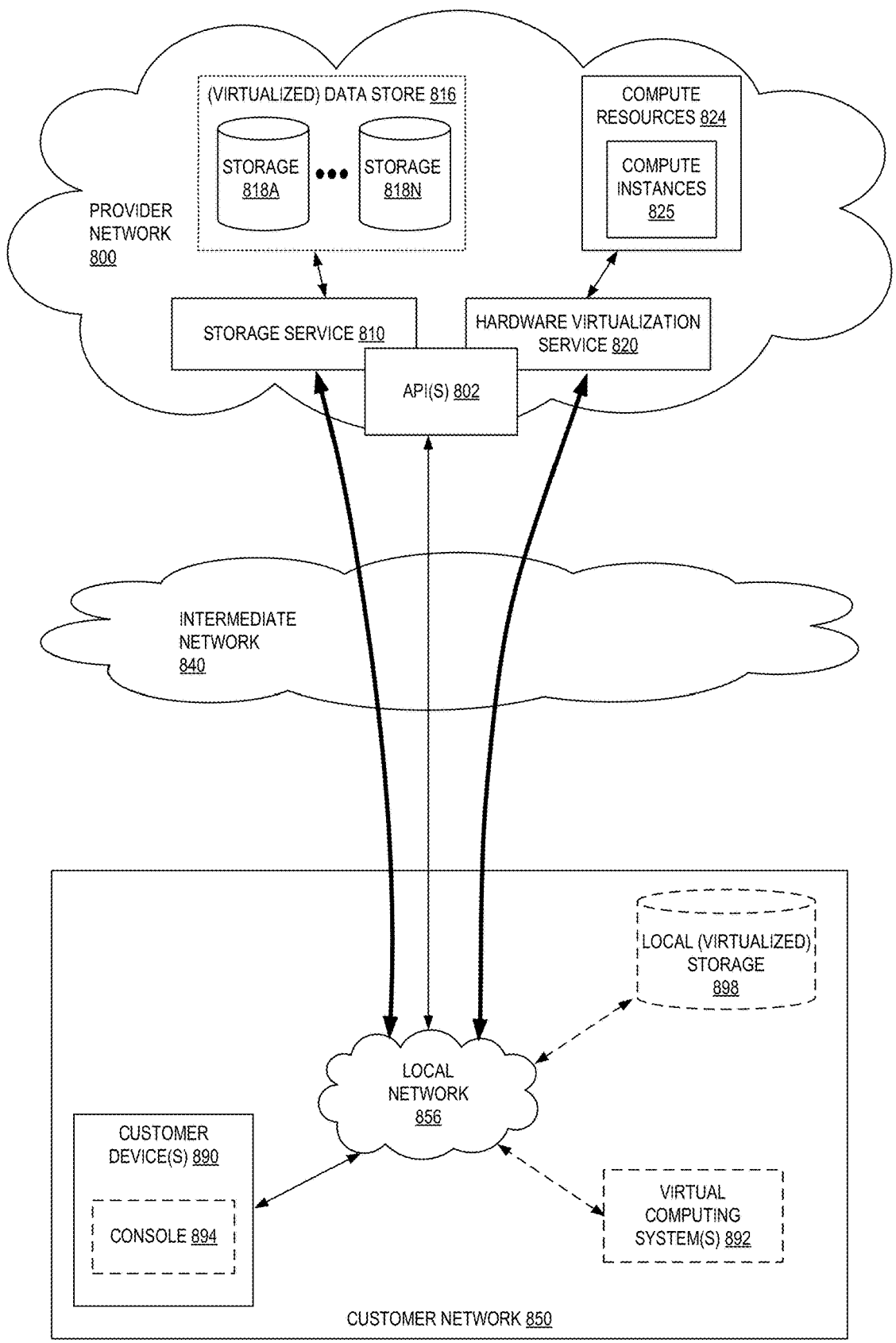
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850) may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
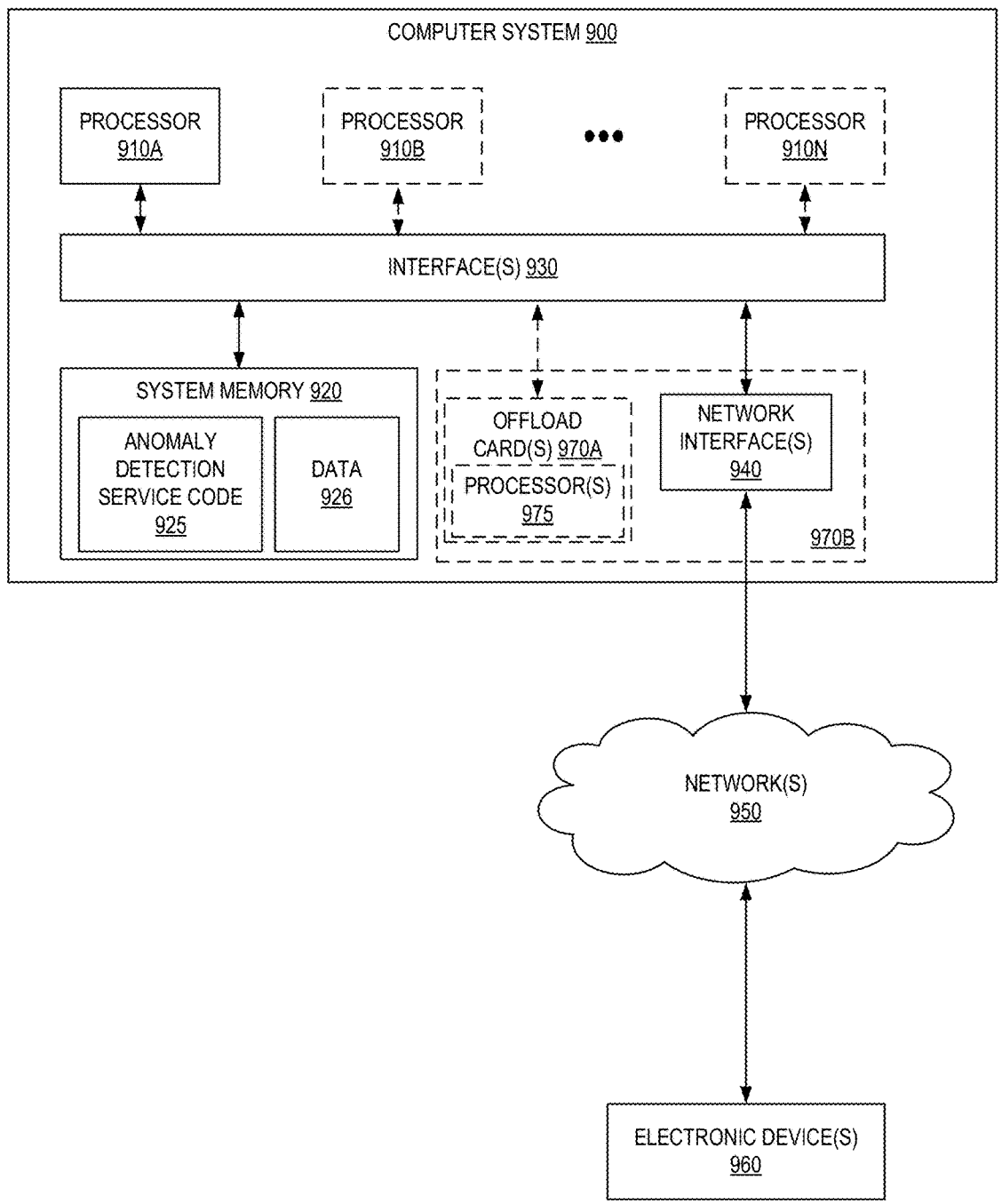
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as anomaly detection service code 925 (e.g., executable to implement, in whole or in part, the anomaly detection service 110) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940) may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM. SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP). File Transfer Protocol (FTP). Universal Plug and Play (UPnP). Network File System (NFS). Common Internet File System (CIFS). Extensible Messaging and Presence Protocol (XMPP). AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers. File Transfer Protocol (FTP) servers. Common Gateway Interface (CGI) servers, data servers. Java servers, business application servers, etc. The server(s) also may be capable of executing programs or scripts in response requests from user devices, such as by executing one or more Web applications that may be implemented as one or more scripts or programs written in any programming language, such as JavaR. C. C# or C++, or any scripting language, such as Perl, Python. PHP, or TCL, as well as combinations thereof. The server(s) may also include database servers, including without limitation those commercially available from Oracle®. Microsoft®. Sybase®. IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to develop an anomaly detection system having at least one scoring model;
   training the anomaly detection system on training data as indicated in the request;
   receiving data to detect potential anomalies using the anomaly detection system;
   processing the data using the anomaly detection system to score the data to determine when the data is potentially anomalous based on a threshold;
   requesting feedback on at least one determined potential anomaly;
   receiving feedback on the least one determined potential anomaly;
   determining the feedback is positive;
   determining an anomaly detection rate is below a detection rate threshold; and
   adjusting, based on the feedback and based on the determining the anomaly detection rate is below the detection rate threshold, the threshold used to determine when the data is potentially anomalous.

2. The computer-implemented method of claim 1, wherein the request includes one or more of: an indication of a location of a dataset to be used for training; a dataset to be used for training; an indication of at least one machine learning algorithm to train to become an anomaly detection model; at least one machine learning algorithm to train to become an anomaly detection model; and an indication of a location to store results of anomaly detection.

3. A computer-implemented method comprising:
receiving a request to detect potential anomalies using an anomaly detection system having at least one anomaly scoring model;
processing received data using the anomaly detection system to score the received data to determine when the received data is potentially anomalous based on one or more thresholds;
requesting feedback on at least one determined potential anomaly;
receiving feedback on the least one determined potential anomaly;
determining the feedback is positive;
determining an anomaly detection rate is below a detection rate threshold; and
adjusting, based on the feedback and based on the determining the anomaly detection rate is below the detection rate threshold, at least one of the one or more thresholds used to determine when the received data is potentially anomalous.

4. The computer-implemented method of claim 3, further comprising:
training the anomaly detection system on training data that is unlabeled.

5. The computer-implemented method of claim 3, further comprising:
training the anomaly detection system on training data that is labeled.

6. The computer-implemented method of claim 3, wherein requesting feedback on the at least one determined potential anomaly includes providing a graphical user interface showing the potential anomaly and a means for providing feedback on the potential anomaly.

7. The computer-implemented method of claim 3, wherein the anomaly detection system is a plurality of machine learning models and the score is a function of an output score of the plurality of machine learning models.

8. The computer-implemented method of claim 3, further comprising:
requesting additional feedback on another determined potential anomaly;
receiving the additional feedback on the another determined potential anomaly;
determining the additional feedback is negative;
updating a feedback set for negative feedback with a score and a time stamp for the received data;
calculating a new threshold value; and
updating the one or more thresholds to a value with the new threshold value.

9. The computer-implemented method of claim 3, further comprising:
determining relevance for a plurality of anomaly clusters; and
adjusting what is considered an anomaly based on the relevance.

10. The computer-implemented method of claim 3, wherein the request includes one or more of an indication of a machine learning model to use as an anomaly scoring model, hyperparameters, or an indication of a location to store results of anomaly detection.

11. The computer-implemented method of claim 3, wherein the received data comes from a monitoring service.

12. A system comprising:
a first one or more electronic devices to implement a data source; and
a second one or more electronic devices to implement an anomaly detection service in a multi-tenant provider network, the anomaly detection service including instructions that upon execution by one or more processors cause the anomaly detection service to:
receive a request to detect potential anomalies using an anomaly detection system, of the anomaly detection service, having at least one anomaly scoring model;
process received data using the anomaly detection system to score the received data to determine when the received data is potentially anomalous based on one or more thresholds;
request feedback on at least one determined potential anomaly;
receive feedback on the least one determined potential anomaly;
determine the feedback is positive;
determine an anomaly detection rate is below a detection rate threshold; and
adjust, based on the feedback and based on the determining the anomaly detection rate is below the detection rate threshold, at least one of the one or more thresholds used to determine when the received data is potentially anomalous.

13. The system of claim 12, wherein the anomaly detection service is further to: train the anomaly detection system on training data that is unlabeled.

14. The system of claim 12, wherein the anomaly detection service is further to: train the anomaly detection system on training data that is labeled.

15. The system of claim 12, wherein the request includes one or more of an indication of a machine learning model to use as an anomaly scoring model, hyperparameters, or an indication of a location to store results of anomaly detection.

16. The system of claim 12, wherein requesting feedback on the at least one determined potential anomaly includes providing a graphical user interface showing the potential anomaly and a means for providing feedback on the potential anomaly.

17. The system of claim 12, wherein the anomaly detection system is a plurality of machine learning models and the score is a function of an output score of the plurality of machine learning models.

18. The system of claim 12, wherein the anomaly detection service is further to:
request additional feedback on another determined potential anomaly;
receive the additional feedback on the another determined potential anomaly;
determine the additional feedback is negative;
update a feedback set for negative feedback with a score and a time stamp for the received data;
calculate a new threshold value; and
update the one or more thresholds to a value with the new threshold value.

19. The system of claim 12, wherein the anomaly detection service is further to:
determine relevance for a plurality of anomaly clusters; and
adjust what is considered an anomaly based on the relevance.

20. The system of claim 12, wherein the received data comes from a monitoring service.

* * * * *